United States Defensive Publication [19] (H) [11] T103,002

Petke [43] May 3, 1983

[54] POLYESTER PRIMER FOR ADHESIVELY BONDED SUBSTRATES

[76] Inventor: Frederick D. Petke, 1426 Watauga St., Kingsport, Tenn. 37664

[21] Appl. No.: 390,492

[22] Filed: Jun. 21, 1982

Related U.S. Application Data

[63] Continuation-in-part of Ser. No. 172,914, Jul. 28, 1980, abandoned.

[51] Int. Cl.[3] ..... C08F 265/04; C08L 67/02; C08F 267/00

[52] U.S. Cl. ..... 524/605; 525/305; 525/309; 427/412.1; 427/412.5; 427/412.4; 428/412; 428/421; 428/480; 428/481; 428/507; 428/537

[57] ABSTRACT

Disclosed are primer compositions for enhancing the adhesion of hot-melt adhesives to substrates comprising a copolyester of at least 50 mole percent terephthalic acid, about 10–90 mole percent 1,4-butanediol or 1,6-hexanediol, and a solvating amount of a volatile solvent, the copolyester having an I.V. of about 0.3–1.5 dl/g and a melting point of about 100°–200° C.

13 Claims, No Sheets Drawing,

9 Pages-Specification

The file of this unexamined application may be inspected and copies thereof may be purchased (849 O.G. 1221, Apr. 9, 1968).